(12) United States Patent
Gagliardi et al.

(10) Patent No.: US 10,479,171 B2
(45) Date of Patent: Nov. 19, 2019

(54) LAMINATED VEHICLE GLAZING

(71) Applicant: Pilkington Group Limited, Lathom, Nr. Ormskirk, Lancashire (GB)

(72) Inventors: Giovanni Gagliardi, Chieti (IT); Mark Andrew Chamberlain, Ormskirk (GB); Leigh Francis Mellor, St Helens (GB); Marco Ronci, Chieti (IT)

(73) Assignee: PILKINGTON GROUP LIMITED, NR. Ormskirk, Lancashire (GB)

( * ) Notice: Subject to any disclaimer, the term of this patent is extended or adjusted under 35 U.S.C. 154(b) by 0 days.

(21) Appl. No.: 16/066,379

(22) PCT Filed: Dec. 21, 2016

(86) PCT No.: PCT/GB2016/054029
§ 371 (c)(1),
(2) Date: Jun. 27, 2018

(87) PCT Pub. No.: WO2017/115074
PCT Pub. Date: Jul. 6, 2017

(65) Prior Publication Data
US 2019/0023106 A1 Jan. 24, 2019

(30) Foreign Application Priority Data
Dec. 29, 2015 (EP) .................... 15425115

(51) Int. Cl.
*B32B 15/04* (2006.01)
*B32B 17/06* (2006.01)
(Continued)

(52) U.S. Cl.
CPC ......... *B60J 1/001* (2013.01); *B32B 17/10036* (2013.01); *B32B 17/1066* (2013.01);
(Continued)

(58) Field of Classification Search
USPC ................. 428/426, 428, 432, 688
See application file for complete search history.

(56) References Cited

U.S. PATENT DOCUMENTS

| 4,278,875 A | 7/1981 | Bain |
| 5,324,374 A * | 6/1994 | Harmand .......... B32B 17/10036 156/100 |

(Continued)

FOREIGN PATENT DOCUMENTS

| EP | 0 869 057 A2 | 10/1998 |
| WO | WO 03/011688 A2 | 2/2003 |

(Continued)

OTHER PUBLICATIONS

International Search Report (PCT/ISA/210) dated Apr. 3, 2017, by the European Patent Office as the International Searching Authority for International Application No. PCT/GB2016/054029.

(Continued)

*Primary Examiner* — Lauren R Colgan
(74) *Attorney, Agent, or Firm* — Buchanan, Ingersoll & Rooney PC

(57) ABSTRACT

A laminated vehicle glazing is disclosed, the glazing comprising a first glass ply coated with an electrically conductive coating, a second glass ply, an interlayer ply comprising polyvinyl butyral, and a first busbar comprising a conductive foil, wherein the electrically conductive coating comprises a pyrolytically deposited transparent conductive oxide layer and in that the first busbar is in direct contact with both the electrically conductive coating and the interlayer ply. Preferably the pyrolytically deposited transparent oxide layer comprises doped tin oxide and is the outermost layer of the electrically conductive coating. Also disclosed are a vehicle windshield and a train having a power supply at 25 V to 250

(Continued)

V, comprising a laminated vehicle glazing. A method for manufacturing a laminated vehicle glazing is also disclosed.

16 Claims, 2 Drawing Sheets

(51) Int. Cl.
    *B60J 1/00*     (2006.01)
    *B32B 17/10*     (2006.01)
    *C03C 17/36*     (2006.01)
    *H05B 3/84*     (2006.01)

(52) U.S. Cl.
    CPC .. *B32B 17/10174* (2013.01); *B32B 17/10348* (2013.01); *B32B 17/10761* (2013.01); *C03C 17/3639* (2013.01); *C03C 17/3644* (2013.01); *C03C 17/3655* (2013.01); *C03C 17/3673* (2013.01); *H05B 3/84* (2013.01); *C03C 2217/77* (2013.01); *C03C 2217/94* (2013.01); *H05B 2203/013* (2013.01)

(56) References Cited

U.S. PATENT DOCUMENTS

| | | | |
|---|---|---|---|
| 6,034,353 | A | 3/2000 | Demeester |
| 9,100,996 | B2 | 8/2015 | Lisinski et al. |
| 2008/0070045 | A1 | 3/2008 | Barton et al. |
| 2013/0004719 | A1* | 1/2013 | Thellier ............ B32B 17/10036 428/157 |
| 2013/0082043 | A1 | 4/2013 | McCarthy |
| 2013/0220992 | A1 | 8/2013 | Lisinski et al. |

FOREIGN PATENT DOCUMENTS

| | | |
|---|---|---|
| WO | WO 2006/091531 A2 | 8/2006 |
| WO | WO 2008/047164 A1 | 4/2008 |

OTHER PUBLICATIONS

Written Opinion (PCT/ISA/237) dated Apr. 3, 2017, by the European Patent Office as the International Searching Authority for International Application No. PCT/GB2016/054029.

* cited by examiner

LAMINATED VEHICLE GLAZING

The present invention relates to laminated vehicle glazings and to methods for manufacturing laminated vehicle glazings.

Laminated vehicle glazings comprising two or more sheets of glazing material, especially glass, bonded together using bonding polymers are useful as vehicle glazings, especially as windshields or rear glazings.

It is useful to provide such laminated vehicle glazings with a de-misting and/or a de-icing function by providing a means of electrically heating the laminated vehicle glazing. To provide a laminated vehicle glazing having an electrically conductive region one of the plies may be provided, across the portion of the glazing to be heated, with thin tracks of electrically conductive ink or with thin wires or with electrically conductive coatings on the surface of at least one of the plies of the laminate.

US-A-2013/082043 discloses an aircraft glazing with a heatable member with a plurality of segments that may be formed from any suitable electrically conductive material.

U.S. Pat. No. 6,034,353 discloses a laminated vehicle glazing for an aircraft cockpit with a conductive heating element inside the laminate and illustrates a conductive heating element comprising a network of electric wires.

Unfortunately, wires can lead to optical distortion in glazings and affect the properties of the polymer interlayer in the laminate.

Conductive coatings for use in laminate heating applications usually comprise at least one silver layer embedded between two dielectric layers or layers of indium tin oxide (ITO). Such ITO or silver coatings may be deposited on the surface of at least one of the plies by vacuum coating processes, for example, sputtering.

U.S. Pat. No. 9,100,996 discloses transparent panes having electrically heatable coatings. U.S. Pat. No. 4,278,875 discloses electrically heatable window panes for use in an aircraft windshield comprising sputtered coatings a few Angstroms thick of electrically conductive oxide sandwiched between fused sheets of glass.

WO-A-03/011688 discloses a fog-preventing electrochromic aircraft window assembly having at least two panes in the laminate and two electrically conductive coatings on panes on either side of the laminate, electrical connection facilities and an electrochromic medium between the sheets.

Electrically conductive coatings or wires generally have busbars which are in electrical contact with the electrically conductive coating or wires and serve to connect the electrically conductive coating or wires to the power supply.

A problem may arise especially during the lamination of a vehicle laminate in that the busbars may damage the sputtered coatings. This can result in hot and/or cold spots forming during electrical powering of the circuit. Such damage may result in discarded parts or may cause premature failure of the part whilst in service and may be a problem for relatively large glazings of the order of 0.9 m² or larger, due to difficulty aligning a busbar.

A solution that has been proposed is the use of silver printed busbars (using a silver ink usually comprising silver particles in a glass frit) screen printed and then fired on the glass to contact the coating directly.

EP-A-0 869 057 discloses sound absorbing aircraft windows with a transparent electrically conductive coating preferably of ITO with electrical connection facilities that may be busbars of silver ink with ITO sputtered over the busbars. WO-A-2006/091531 discloses a similar arrangement with electrical connection involving busbars with transparent conductive coatings being coated over the busbars.

However, the use of printed busbars may lead to greater expense and more complex manufacturing processes and higher numbers of rejected parts.

It is an aim of the present invention to address such problems.

The present invention according provides, in a first aspect, a laminated vehicle glazing comprising,
a first glass ply coated with an electrically conductive coating,
a second glass ply,
an interlayer ply comprising polyvinyl butyral, and
a first busbar comprising a conductive foil,
characterised in that, the electrically conductive coating comprises a pyrolytically deposited transparent conductive oxide layer and in that the first busbar is in direct contact with both the electrically conductive coating and the interlayer ply.

A pyrolytically deposited coating that may, preferably, be deposited on a glass ply by on-line coating is greatly advantageous in terms of process and product robustness especially compared to vacuum coatings, including sputtered coatings (e.g. of silver or metal oxides including ITO).

It has also surprisingly been discovered by the inventors that pyrolytically deposited coatings have a better electrical contact with the busbar than prior art sputtered coatings. Because of the increased robustness, pyrolytic coatings are particularly suitable for relatively large glazings for vehicle, e.g. trains, and address the problem of prior art coatings, e.g. sputtered coatings (even though they may be more conductive) of coating breakdown when voltage is applied in use, following damage due to busbar alignment. Thus, glazings according to the invention are greatly advantageous because they reduce failure of parts in use.

Usually, the laminated vehicle glazing will further comprise a second busbar in electrical contact with the electrically conductive coating.

The first, and optionally, the second, busbar preferably comprise metal foil. The metal foil preferably comprises copper, more preferably tinned copper.

The interlayer ply comprising PVB is advantageous because PVB exhibits good adhesion after lamination to both the coated and uncoated glass plies.

The pyrolytically deposited transparent conductive oxide may comprise tin oxide, doped tin oxide, doped zinc oxide or a mixture of two or more of these oxides. Other possible TCOs include undoped zinc oxide, alkali metal (potassium, sodium or lithium) stannates, zinc stannate, cadmium stannate or a mixture of two or more oxides. The preferred transparent conductive oxide comprises doped tin oxide, preferably fluorine doped tin oxide.

Useful pyrolytically deposited coatings include in particular chemical vapour deposited (CVD) coatings. Preferably, the coatings are of CVD metal oxide, for example, tin oxide. Some metal oxides including doped tin oxide (for example fluorine doped tin oxide) and doped zinc oxide (for example aluminium doped zin oxide) can form transparent conductive oxide (TCO) coatings. Coatings with sheet resistance values less than about 1,500 to 1,000 Ω/square are generally considered to be conductive coatings. A coating of pure stoichiometric tin oxide on a glass substrate would generally have an extremely high sheet resistance. In some circumstances, tin oxide coatings may have a sheet resistance of about 350-400Ω per square due, at least partly, to oxygen deficiency in the tin oxide, rendering it conductive.

Fluorine and other elements may be used as dopants in order to increase the conductivity of tin oxide.

The pyrolytic transparent conductive oxide coating is preferably a chemical vapour deposition transparent conductive oxide coating, more preferably an atmospheric pressure chemical vapour deposition (CVD) transparent conductive oxide coating. It is preferred if the pyrolytic transparent conductive oxide coating is an on-line deposited CVD transparent conductive oxide coating (i.e. deposited during the float glass production process when the float glass ribbon is at a temperature above 400° C.).

The pyrolytic transparent conductive oxide coating is preferably such that it was deposited on to the surface of glass (the coated glass will preferably form the first glass ply coated with the electrically conductive coating comprising the pyrolytically deposited transparent conductive oxide layer) wherein the temperature of the glass was in the range of 450° C. to 725° C., preferably in the range of 550° C. to 700° C., more preferably in the range of 575° C. to 675° C. and most preferably in the range of 590° C. to 660° C.

Usually, the electrically conductive coating will comprise, in addition to the pyrolytically deposited transparent conductive oxide layer one or more further layers. The one or more further layers may include layers of silica, tin oxide (doped or undoped). The further layer(s) may be used in order to adjust the optical properties of the electrically conductive coating, to provide one or more alkali blocking layers or to improve the growth and deposition of other layers of the coating. A most preferred embodiment of the electrically conductive coating comprises layers on a glass substrate in the order: glass/$SnO_2$/$SiO_2$/F-doped $SnO_2$.

It is preferred that the pyrolytically deposited transparent conductive oxide layer is the outermost layer (i.e. the layer that is in direct contact with the interlayer in the laminated vehicle glazing) of the electrically conductive coating. This is advantageous because it thereby improves the electrical contact with the first busbar. Thus, in a preferred embodiment of the invention, the pyrolytically deposited transparent conductive oxide layer is the outermost layer of the electrically conductive coating and the first busbar is in direct contact with the pyrolytically deposited transparent conductive oxide layer.

Usually, the layer of a transparent conductive oxide will be such as to have a sheet resistance in the range 1 Ω/square to 70 Ω/square, preferably 1 Ω/square to 60 Ω/square, more preferably 1 Ω/square to 50 Ω/square and most preferably 1 Ω/square to 40 Ω/square.

Preferably, the sheet resistance of the layer of a transparent conductive oxide will be such as to have a sheet resistance in the range 5 Ω/square to 70 Ω/square, preferably 5 Ω/square to 50 Ω/square, more preferably 5 Ω/square to 30 Ω/square and most preferably 5 Ω/square to 25 Ω/square. The sheet resistance of TCO coatings (especially fluorine doped tin oxide coatings) may be modified by changing the thickness of the coating (generally a thicker coating has lower sheet resistance), changing the nature or amount of dopant, or by varying the temperature of the glass substrate during deposition.

Because of the preferred range of sheet resistance of the layer of a transparent conductive oxide, laminated vehicle glazings according to the invention are preferably adapted to be installed in vehicles having power supplies at 25 V to 250 V, preferably 30 V to 250V and most preferably 40 V to 110 V.

Generally, the transparent conductive oxide coating will have an average surface roughness, Sa, (as determined according to ISO 25178, Sa being defined therein as the arithmetical mean height of the surface determined by AFM using a scan size of 5 μm×5 μm) in the range 8 to 20 nm.

The first busbar (and/or second busbar) is formed (preferably pre-formed) from the conductive foil, preferably from metal foil, by generally any suitable method. The conductive foil may be in the form of a ribbon or strip (usually stored on a spool) that may simply be cut to length (after unspooling if appropriate). In some cases, for example where a more complex shape for the conductive foil is required, the first busbar (and/or second busbar) may be formed by stamping and/or cutting of a sheet or ribbon/strip of conductive foil.

It is advantageous if the busbar(s) is/are formed from conductive foil, preferably metal foil, provided with an adhesive layer.

Usually, the first (and second) busbar will have a thickness in the range 20 μm to 150 μm, and usually will have a width in the range 3 mm to 15 mm. It is preferable that the busbar portion is not too thin nor too narrow to ensure that it has sufficient electrical conductivity to reduce the chance of a hotspot occurring.

In many laminated vehicle glazings, the glazing may further comprise an obscuration band on the first ply and/or on the second ply of glass or an obscuration band situated in the interlayer ply. This is advantageous because the obscuration band may be adapted to obscure the busbar and any connectors when the laminated vehicle glazing is installed and in use in addition to blocking UV, preventing aging of an adhesive which bonds the glazing to a vehicle body.

The obscuration band if provided on the first and/or second glass ply may be formed by printing (e.g. screen printing) a dark, usually black, band on the peripheral portion of the ply. The obscuration band if situated in the interlayer ply may be provided in the form of a dark coloured frame of the interlayer (e.g. dark tinted PVB, preferably black tinted PVB) surrounding a portion of clear, transparent interlayer.

The laminated vehicle glazing may also comprise a shade band, preferably situated at the top portion of the glazing (once installed and in use). The shade band may be formed by providing a tinted portion of interlayer material arranged so that it is in the top portion of the glazing (below the obscuration band, if present). The shade band is intended to provide shading of sunlight for users of the vehicle in which the laminated vehicle glazing is to be installed.

The interlayer may comprise (before lamination) one, two, three or more sheets of PVB.

The laminated vehicle glazing may comprise one or more further plies of, for example, polycarbonate (for toughness), or polyethylene terephthalate (PET). Such further plies are preferably sandwiched between layers of interlayer, preferably PVB, inside the laminate.

A particularly advantageous application of laminated vehicle glazings according to the invention is in large vehicle glazings having an area of the order of 0.9 $m^2$ or greater, 1.3 $m^2$ or greater, 1.5 $m^2$ or greater, preferably 1.7 $m^2$ or greater, more preferably 2 $m^2$ or greater, most preferably 2.5 $m^2$ or greater. Such vehicle glazings (which are relatively heavy) are of particular use in large land vehicles for example trains (as e.g. windshields).

The laminated vehicle glazing may have four sides, usually a first pair of opposed relatively long sides and a second pair of opposed relatively short sides. At least the first pair or the second pair may be generally parallel. If only the first pair or the second pair are generally parallel, the vehicle glazing may be generally trapezoid. If both the first pair and second pair are generally parallel, the vehicle glazing may be generally rectangular.

The length of the, or each, relatively long side is preferably in the range 1.3 m to 3.5 m, more preferably in the range 2.1 m to 3.1 m, and most preferably in the range 2.4 m to 3.0 m.

The length of the, or each, relatively short side is preferably in the range 0.5 m to 1.5, preferably in the range 0.7 m to 1.3 m, most preferably in the range 0.8 m to 1.2 m.

Preferably, the first and second busbars will be situated in the peripheral portions of different sides of the laminated vehicle glazing with a distance between the first busbar and second busbars. The area formed by the length of the first busbar and second busbar and the distance between the first busbar and the second busbars forms the heatable area of the glazing.

It is preferred that the aspect ratio, that is the ratio of length of a relatively long side of the glazing to a relatively short side of the glazing, is in the range 1.5 to 5, preferably in the range 2 to 3.5 and more preferably in the range 2.4 to 3.0 most preferably in the range 2.5 to 2.9.

Preferably, the first busbar and the second busbar extend along the relatively long sides of the glazing. This is advantageous because the distance between the first and second busbars is thereby relatively short, enabling good de-misting or de-icing properties even if the sheet resistance of the pyrolytically deposited conductive oxide coating is relatively high.

The laminated vehicle glazing according to the invention may be generally flat or curved.

The heatable area of the laminated vehicle glazing according to the invention is preferably relatively large and will generally be at least 50%, preferably at least 60%, more preferably at least 70% even more preferably at least 80%, and most preferably at least 90% of the area of the laminated vehicle glazing.

In a second aspect of the present invention, there is provided a windshield for a vehicle (preferably for a train) having an area of greater than 2 m², comprising a laminated vehicle glazing according to the first aspect.

In a third aspect, the present invention provides, a train having a power supply at 25 V to 250V and comprising a laminated vehicle glazing according to the first aspect.

The laminated vehicle glazing may be made by a lamination process using elevated temperature and, usually, high pressure e.g. in an autoclave.

In a fourth aspect, there is provided a method for manufacturing a laminated vehicle glazing, the method comprising:
  a) providing a first glass ply coated with an electrically conductive coating
  b) providing an interlayer ply comprising polyvinyl butyral,
  c) providing a second glass ply,
  d) providing a first busbar comprising a conductive foil, and
  e) laminating the glazing,
characterised in that, the electrically conductive coating comprises a pyrolytically deposited transparent conductive oxide layer, and in that the first busbar is arranged so that after lamination it is in direct contact with both the electrically conductive coating and the interlayer ply.

The present invention will now be described by way of example only, and with reference to, the accompanying drawings, in which.

Figure 1:
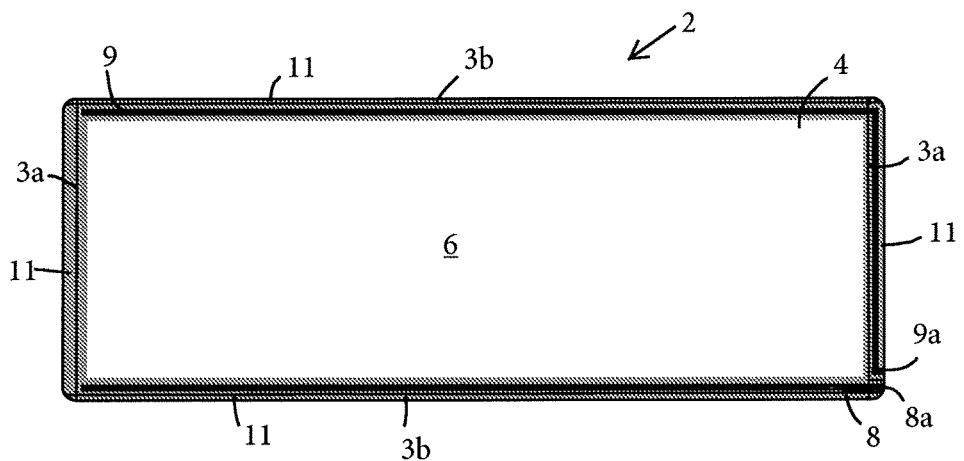
FIG. 1 is a schematic plan view of a first laminated vehicle glazing according to the invention.

FIG. 1 shows a plan view of a train windshield 2 according to an embodiment of the invention and as generally described (at half scale) in Example 1. The train windshield (at full size) is approximately 2.7 m wide by 1 m high in size and comprises a laminated vehicle glazing 4. Other types of laminated vehicle glazing may, of course, be constructed and fall within the scope of the present invention.

The train windshield 2 comprises an electrically heatable portion 6 over the width of the train windshield 2, between the coating cut lines 3 and approximately 0.5 m high. Electrical connection is made by a first busbar 8 along and a short distance inwardly situated from the bottom edge portion of the windshield and a second busbar 9 along and a short distance inwardly situated from the top edge portion. Top and bottom refer to the orientation of the train windshield when installed in a train and in use and are as indicated in FIG. 1. First busbar 8 and second busbar 9 have connection portions 8a and 9a respectively for connection to the electrical system of the train when installed. The electrical system will usually run at 25 V to 250 V, more usually 50 V or 100 V (A.C. or D.C.). In a frame 11 around the peripheral portion of the glazing 4 there is an obscuration band formed of a black frame of interlayer material as described below.

Figure 2:
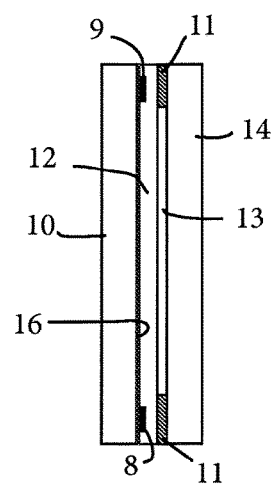
FIG. 2 is a schematic cross section of the laminated vehicle glazing of FIG. 1.

FIG. 2 shows a schematic section through the train windshield 2. The first 8 and second busbar 9 make electrical connection to a transparent conductive oxide layer 16 of fluorine doped tin oxide of nominal sheet resistance about 15Ω per square deposited pyrolytically on the laminate inner surface of a first glass ply 10 about 4 mm thick. The first glass ply 10 is laminated to a second glass ply 14 also about 4 mm thick by two interlayer plies: a first interlayer ply 12 of polyvinyl butyral (PVB, about 0.76 mm thick) and a second interlayer ply 13 of polyvinyl butyral (PVB, about 0.38 mm thick). The second interlayer ply 13 has a frame 11 of black tinted PVB adhered around its periphery which forms an obscuration band.

Figure 3:
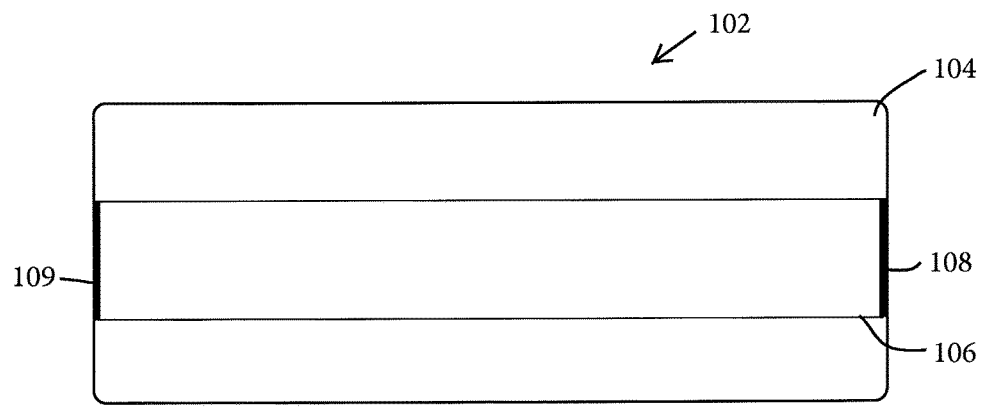
FIG. 3 is a schematic plan view of a second laminated vehicle glazing according to the invention.

FIG. 3 shows a plan view of a train windshield 102 according to a second embodiment of the invention. The train windshield is approximately 2.7 m wide by 1 m high in size and comprises a laminated vehicle glazing 104. Other types of laminated vehicle glazing may, of course, be constructed and fall within the scope of the present invention.

The train windshield 102 comprises an electrically heatable portion 106 across the full width of the train windshield 102 and approximately 0.5 m high to which electrical connection is made by a first busbar 108 and a second busbar 109.

Figure 4:
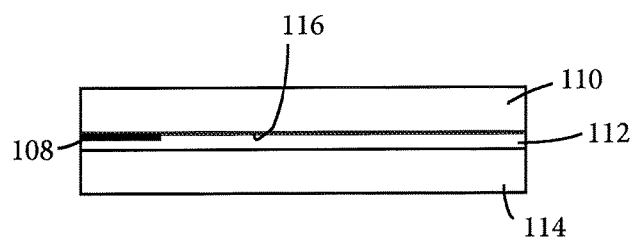
FIG. 4 is a schematic cross section of the laminated vehicle glazing of FIG. 3.

FIG. 4 shows a schematic section through the train windshield 102 in the area of the first busbar 108. The first 108 and second busbar 109 make direct electrical connection to a transparent conductive oxide layer 116 of fluorine doped tin oxide of sheet resistance nominally about 15Ω per square deposited pyrolytically on the laminate inner surface of a first glass ply 110 about 4 mm thick. The first glass ply 110 is laminated to a second glass ply 114 also about 4 mm thick by an interlayer ply 112 of polyvinyl butyral (PVB) making up the laminated vehicle glazing. The interlayer ply 112 may be between 0.3 and 1.2 mm thick.

Laminated vehicle glazings 4 or 104 may be made generally as described below. Plies of the following materials are laid upon one another in order: a first ply of glass coated with an electrically conductive coating comprising a pyrolytically deposited transparent conductive oxide layer of F doped tin oxide, a first interlayer ply (0.76 mm thick) of PVB, a second interlayer ply (0.38 mm thick) of PVB and a second glass ply. The first and second busbars are provided on the first interlayer ply and arranged in direct electrical contact with the electrically conductive coating. The busbars are of a thickness about 100 μm and width about 10 mm and were obtained from a spool of tinned copper foil strip having a layer of adhesive to make a self-adhesive strip. The adhesive had thickness about 50 μm. The busbars were bonded to the interlayer ply using the self-adhesive strip. The second interlayer ply had a peripheral frame of black PVB adhered to it to form an obscuration band after lamination. The busbars were arranged so as to be obscured by the obscuration bands.

The laminated vehicle glazing may be laminated by methods involving a first step using a vacuum bag around the laid-up laminate, and wherein a vacuum is applied at approximately room temperature to de-gas the interlayer ply or plies. In a second step, still under vacuum, the first and second glass plies are heated to a temperature in the range 80° C. to 110° C., such that the interlayer ply softens sufficiently to bond with the first and second glass plies. In a third step, the first and second glass plies are laminated together in an autoclave in the pressure range 6 bar to 14 bar and in the temperature range 120° C. to 150° C.

The present invention will now be further illustrated by the Examples in which samples of laminated vehicle glazings consisting of a glass ply coated with an electrically conductive layers of fluorine doped tin oxide was laminated to a second glass ply using PVB interlayer. Metal foil busbars were placed (in the laminate) in direct contact with the electrically conductive layers before lamination.

EXAMPLES

Electrical Properties

The sheet resistance of the Examples was determined using a surface resistivity meter with a 4-point probe (Guardian Model SRM 232). Measurements were taken at the same thickness for each sample, and the mean of three measurements was taken.

Atomic Force Microscope

AFM (Bruker, Nanoscope Dimension Icon) was used to determine the roughness of samples including average surface roughness, Sa and Sq (as determined according to ISO 25178-2:2012, "Geometric Product Specifications (GPS)—Surface texture: Areal—Part 2: Terms, definitions and surface texture parameters", published 2012, Sa being defined therein as the arithmetical mean height of the surface).

The roughness of pyrolytically coated glass substrates of float glass coated with fluorine doped tin oxide (as the outer layer) of differing nominal resistance, before and after polishing is as indicated in Table 1 (for a scan size of 5 μm×5 μm). Any of these samples would be suitable for use in the present invention, with the roughness Sa above 8 nm being advantageous in providing enhanced electrical connection between the coated surface and busbar.

TABLE 1

| Sample | Nominal Sheet resistance (ohm/square) | Polished | Average Sa (nm) |
| --- | --- | --- | --- |
| E1-1 | 6 | No | 19.2 |
| E1-2 | 6 | Yes | 16.6 |
| E1-3 | 6 | Yes | 15.2 |
| E1-4 | 6 | Yes | 14.4 |
| E1-5 | 10 | No | 15.4 |
| E1-6 | 10 | Yes | 14.3 |
| E1-7 | 10 | Yes | 12.1 |
| E1-8 | 10 | Yes | 9.9 |
| E1-9 | 15 | No | 13.0 |
| E1-10 | 15 | Yes | 10.1 |
| E1-11 | 15 | Yes | 9.8 |
| E1-12 | 15 | Yes | 8.9 |

Substrates

In the Examples, the coated glass plies were of float glass coated with fluorine doped tin oxide (as the outer layer).

The coated glass plies were of the form glass/undoped $SnO_2/SiO_2/F$ doped $SnO_2$ with the doped tin oxide layer to produce a coated glass ply having a sheet resistance of 15 Ω/square. By varying the thickness of the doped tin oxide coating the sheet resistance may also be varied.

The fluorine-doped tin dioxide layer was deposited using on-line CVD coating. This is done during the float glass production process with the temperature of the glass substrate at 600 to 650° C. A tin-containing precursor, in the form of dimethyltin dichloride (DMT), is heated to 177° C. and a stream of carrier gas, in the form of helium, is passed through the DMT. Gaseous oxygen is subsequently added to the DMT/helium gas stream. At the same time, a fluorine-containing precursor, in the form of anhydrous hydrogen fluoride (HF), is heated to 204° C. Additional water is added to create a mixture of gaseous HF and water. The two gas streams are mixed and delivered to the hot glass surface at a rate of around 395 litres/minute. The ratio of DMT to oxygen to HF is 3.6:61.3:1. The thickness of the resulting fluorine-doped tin oxide layer is approximately 320 nm and it has a nominal sheet resistance of about 15 Ω/square, measured as 12 to 13 Ω/square.

Example 1

A train windshield of size 1.4 m by 0.55 m generally as illustrated in FIGS. 1 and 2 was prepared.

PVB sheet (0.76 mm thick, Saflex) and clear and black PVB sheet (0.38 mm thick) were stored at 20-22° C. for 24 hours for dimension stabilization. The PVB sheets were cut to size, the 0.76 mm thick sheet to cover the whole laminate and the 0.38 mm sheet clear with a black frame. Self-adhesive, tinned copper foil strip busbars (cut from a spool 8 mm×0.05 mm, 0.04 Ω/m) were adhered to the 0.76 mm PVB sheet. Light green glass (3.84 mm thick) was cut, ground manually washed and rinsed. Washed pyrolytically coated glasses as described above (of measured sheet resistance 12 to 13 Ω/square) were treated to remove the conductive coating along lines 3 (referring to FIG. 1). The PVB duplet was laid up on the green glass. Connectors were applied to the busbars and coated glass put on top, checking that the coating removal lines are well positioned with respect to the busbars. PVB excess was trimmed and some adhesive tape pieces put on the glass edges in order to avoid glass mismatching. The laid up sandwich was put into a vacuum bag inside an oven. Vacuum was applied without heating for 25 minutes, then the oven temperature was raised to 140° C. and maintained for 30 min. After cooling down to room temperature the glasses appeared already fully transparent, and were then put through a standard autoclave cycle. After lamination, the overall circuit resistance between the busbars was measured at 4.7Ω to 4.9Ω.

A defrost test, according to PSA B258510 standard was conducted. The sample was conditioned at −18° C.±2° C. for 4 hours, then 0.045 cm$^3$ of water per cm$^2$ of glass surface was applied in 2 steps. Subsequently, potential was applied (50V dc) and the glazing observed at 1 min. intervals. Measured current was relatively constant at 10.8 to 11.0 A. Visibility was restored after 15 min.

In another test, the samples were heated from room temperature (21° C.) by applying voltage and the temperature was measured after 30 minutes. An objective of this shorter test is to look for hotspots and maximum operating temperature. The maximum operating temperature became reasonably constant at between 52.5° C. and 57.8° C.

Examples 2, 3 and Comparative Examples A and B

In Examples 2 and 3 and Comparative Examples A and B test samples were approx. 30 cm on a side.

In the Comparative Examples A and B, the coated surface comprised off-line (sputtered) triple silver layers having on either side of, and between the silver layers, dielectric layers of: AlN, ZnSnxOy, ZAO, SiAlxNy and ZnO with each layer being of the order of a few nm thick. The total thickness of silver layers is about 25 nm.

In Examples 2 and 3 and Comparative Examples the samples were laminated with tinned copper strip foil busbars (cut from a spool) located on the top and bottom of the laminates. The busbars were attached to 0.76 mm thick PVB using pressure sensitive-adhesive and the bulbar to coating connection was achieved through physical contact only. The samples were laminated through standard pre-nip and autoclave conditions. The samples are summarised in Table 2.

TABLE 2

| Example or Comparative Example | Coating | Method |
|---|---|---|
| 2 | F:SnO$_2$ | On-line |
| 3 | F:SnO$_2$ | On-line |
| A | Triple silver layer | Sputtered |
| B | Triple silver layer | Sputtered |

The circuit resistance of the samples were measured after lay-up and after autoclave. The circuit resistance of the Examples and Comparative Examples is shown in Table 3.

TABLE 3

| | Resistance (ohm) | |
|---|---|---|
| Sample number | As made | After Autoclave |
| 2 | 22.7 | 14.2 |
| 3 | 17 | 14.9 |
| A | 4.8 | 3.7 |
| B | 5.4 | 8.1 |

The samples were tested by powering at 600 W/m$^2$ (50.4 W for the approx. 30 cm square samples) and taking account of the circuit resistance of the samples (see Table 3) the calculated potential and predicted current were determined. The calculated potential was applied and the actual current measured. The results are shown in Table 4. The current draw of the Examples 2 and 3 with pyrolytically deposited coatings was close to predicted current. In contrast, in Comparative Example A current increased to 3.0 A during testing and hot spots were observed along the bottom busbar. In Comparative Example B, current increased to 0.2 A during testing. Flashing 'sparks' were observed along top busbar. These results indicate that the sputtered coatings broke down during testing whereas the pyrolytic coatings were generally unaffected and performed well.

TABLE 4

| Example | Area (m$^2$) | Power (W) | Predicted Current (A) | Calculated and Applied Potential (V) | Measured Actual current (A) | Maximum Temperature after 2 min (° C.) |
|---|---|---|---|---|---|---|
| 2 | 0.084 | 50.4 | 1.88 | 26.75 | 1.9 | 27 |
| 3 | 0.084 | 50.4 | 1.84 | 27.40 | 2.0 | 37 |
| A | 0.084 | 50.4 | 3.69 | 13.66 | 1.4 | 70 |
| B | 0.084 | 50.4 | 2.49 | 20.20 | 0.1 (coating broke down) | 49 |

An advantage of using metal foil busbars, compared with print busbars of silver ink, is that a process of firing the silver ink can cause optical distortion in the glazing.

In WO-A-2006/091531, the busbar is on the glass substrate and the conductive coating was applied on top of the busbar. A pyrolytically deposited transparent conductive oxide layer as the outmost layer of the electrically conductive coating could not be applied on-line because the busbar was not present on a float glass ribbon.

REFERENCE NUMERALS

2 Train windshield
3 Cut coating line
4 Laminated vehicle glazing
6 Electrically heated portion
8 First busbar
8a Connection portion
9 Second busbar
9a Connection portion
10 First glass ply with doped tin oxide coating
11 Black PVB frame
12 First interlayer ply
13 Second interlayer ply
14 Second glass ply
16 Transparent conductive oxide layer 102 Train windshield
104 Laminated vehicle glazing
106 Electrically heated portion
108 First busbar
109 Second busbar
110 First glass ply with doped tin oxide coating
112 Interlayer ply
114 Second glass ply
116 Transparent conductive oxide layer

The invention claimed is:

1. A laminated vehicle glazing comprising,
a first glass ply coated with an electrically conductive coating,
a second glass ply,
an interlayer ply comprising polyvinyl butyral, and
a first busbar comprising a conductive foil,
wherein the electrically conductive coating comprises at least two layers, an outermost layer of which is a pyrolytically deposited transparent conductive oxide layer that is chemical vapour deposited and comprises fluorine doped tin oxide,
wherein the transparent conductive oxide coating has average surface roughness Sa greater than or equal to 8 nm, and
wherein the first busbar is in direct contact with both the electrically conductive coating and the interlayer ply.

2. A laminated vehicle glazing as claimed in claim 1, wherein the conductive foil is pre-formed.

3. A laminated vehicle glazing as claimed in claim 1, wherein the thickness of the pyrolytically deposited transparent conductive oxide layer is in the range 50 nm to 500 nm.

4. A laminated vehicle glazing as claimed in claim 1, wherein the coated first glass ply has a sheet resistance in the range 5 Ω/square to 30 Ω/square.

5. A laminated vehicle glazing as claimed in claim 1, wherein the pyrolytic transparent conductive oxide layer is such that it was deposited on to the surface of glass at a temperature in the range of 450° C. to 725° C.

6. A laminated vehicle glazing as claimed in claim 1, wherein interlayer ply comprises polyvinyl butyral having a thickness before lamination in the range 0.3 mm to 1.5 mm.

7. A laminated vehicle glazing as claimed in claim 1, further comprising a periphery obscuration band formed on one or more of the glass plies or on the interlayer ply.

8. A laminated vehicle glazing as claimed in claim 7, wherein the periphery obscuration band is formed as a tinted frame in the interlayer ply.

9. A laminated vehicle glazing as claimed in claim 1, wherein the ratio of length of a relatively long side of the glazing to a relatively short side of the glazing, is in the range 1.5 to 5.

10. A laminated vehicle glazing as claimed in claim 1, further comprising a second busbar in electrical contact with the electrically conductive coating.

11. A vehicle windshield comprising a laminated vehicle glazing according to claim 1.

12. A vehicle windshield as claimed in claim 11, wherein the area of the windshield is greater than 0.9 m$^2$.

13. A laminated vehicle glazing as claimed in claim 1, wherein the transparent conductive oxide coating has average surface roughness Sa less than or equal to 20 nm.

14. A train having a power supply at 25 V to 250 V and comprising a laminated vehicle glazing as claimed in claim 1.

15. A method for manufacturing a laminated vehicle glazing, the method comprising
a) providing a first glass ply coated with an electrically conductive coating
b) providing an interlayer ply comprising polyvinyl butyral,
c) providing a second glass ply,
d) providing a first busbar comprising a conductive foil, and
e) laminating the glazing,
wherein the electrically conductive coating comprises at least two layers, an outermost layer of which is a pyrolytically deposited transparent conductive oxide layer that is chemical vapour deposited and comprises fluorine doped tin oxide,
wherein the transparent conductive oxide coating has average surface roughness Sa greater than or equal to 8 nm, and
wherein the first busbar is arranged so that after lamination it is in direct contact with both the electrically conductive coating and the interlayer ply.

16. A method for manufacturing a laminated vehicle glazing as claimed in claim 15, wherein the transparent conductive oxide coating has average surface roughness Sa less than or equal to 20 nm.

* * * * *